United States Patent
Berke et al.

(10) Patent No.: US 10,148,185 B2
(45) Date of Patent: Dec. 4, 2018

(54) SYSTEMS AND METHODS FOR EXTENSION OF POWER SUPPLY HOLD-UP TIME

(71) Applicant: Dell Products L.P., Round Rock, TX (US)

(72) Inventors: Stuart Allen Berke, Austin, TX (US); Mehran Mirjafari, Austin, TX (US); Lei Wang, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 249 days.

(21) Appl. No.: 14/551,339

(22) Filed: Nov. 24, 2014

(65) Prior Publication Data

US 2016/0149495 A1    May 26, 2016

(51) Int. Cl.
*H02M 3/335*     (2006.01)
*H02M 1/42*     (2007.01)
H02M 1/00     (2006.01)

(52) U.S. Cl.
CPC ......... *H02M 3/33507* (2013.01); *H02M 1/42* (2013.01); *H02M 1/4241* (2013.01); *H02M 2001/007* (2013.01); *H02M 2001/0058* (2013.01); *H02M 2001/0096* (2013.01); *Y02B 70/12* (2013.01); *Y02B 70/1491* (2013.01)

(58) Field of Classification Search
CPC ...... H02M 3/22; H02M 3/24; H02M 3/33569; H02M 3/155; H02M 3/145; H02M 3/158; H02M 3/1588; H02M 1/42; H02M 1/4208; H02M 2003/1552; H02M 2007/4818; H02M 2007/4815; H02M 2007/4811
See application file for complete search history.

(56) References Cited

U.S. PATENT DOCUMENTS

| | | | |
|---|---|---|---|
| 5,373,432 A * | 12/1994 | Vollin | H02M 3/3376 363/16 |
| 5,684,678 A | 11/1997 | Barrett | |
| 2012/0223687 A1* | 9/2012 | Liu | G05F 1/56 323/271 |

(Continued)

OTHER PUBLICATIONS

Alonso, J. Marcos et al., Investigation of a New Control Strategy for Electronic Ballasts Based on Variable Inductor, IEEE Transactions on Industrial Electronics, vol. 55, No. 1, Jan. 2008, pp. 3-10.

(Continued)

*Primary Examiner* — Nguyen Tran
*Assistant Examiner* — Bryan R Perez
(74) *Attorney, Agent, or Firm* — Jackson Walker L.L.P.

(57) ABSTRACT

In accordance with embodiments of the present disclosure, a voltage rectifier may include an alternating-current-to-direct-current (AC/DC) converter configured to convert an alternating current (AC) source voltage to a first direct current (DC) voltage and a direct-current-to-direct-current (DC/DC) converter configured to convert the first DC voltage to a second DC voltage for delivery to a load of the voltage rectifier, wherein the DC/DC converter is configured to operate in a plurality of operating modes in response to a failure of the AC source voltage. The plurality of operating modes may include a first hold-up mode in which a gain of the DC/DC converter is a first gain and a second hold-up mode in which the gain of the DC/DC converter is a second gain.

19 Claims, 2 Drawing Sheets

(56) References Cited

U.S. PATENT DOCUMENTS

| | | | |
|---|---|---|---|
| 2014/0160805 A1* | 6/2014 | Oh .................... | H02M 3/33507 363/21.02 |
| 2014/0185330 A1* | 7/2014 | Huang ................ | H02M 3/3376 363/21.02 |
| 2014/0266293 A1* | 9/2014 | Ye .......................... | G01R 31/40 324/764.01 |
| 2015/0162817 A1* | 6/2015 | Lee ........................ | H02J 7/007 320/107 |

OTHER PUBLICATIONS

Choi, Seong-Wook et al., LCC Resonant Converter with Hold-up Time Extension Technique for Computer Power Supply, KIPE Annual Conference, Hwasun, Korea, Jun. 2008, pp. 228-230.

Fan, Haifeng et al., A Novel Phase-Shift Bidirectional DC-DC Converter with an Extended High-Efficiency Range for 20 kVA Solid State Transformer, Energy Conversion Congress and Exposition (ECCE), 2010 IEEE, Sep. 12-16, 2010, pp. 3870-3876.

Fu, Dianbo et al., 1MHz High Efficiency LLC Resonant Converters with Synchronous Rectifier, Power Electronics Specialists Conference, 2007, PESC 2007, IEEE, Jun. 17-21, 2007, pp. 2404-2410.

Lin, Ray-Lee et al., Analysis and Design of Full-Bridge LC Parallel Resonant Plasma Driver with Variable-Inductor Based Phase Control, IECON 2010—36th Annual Conference on IEEE Industrial Electronics Society, Nov. 7-10, 2010, pp. 77-82.

Lu, Bing et al., Optimal Design Methodology for LCC Resonant Converter, Twenty-First Annual Applied Power Electronics Conference and Exposition, 2006, APEC '06, IEEE, Mar. 19-23, 2006, pp. 533-538.

Medini, Dror et al., A Current-Controlled Variable-Inductor for High Frequency Resonant Power Circuits, Ninth Annual Applied Power Electronics Conference and Exposition, 1994, APEC '94, Conference Proceedings 1994, pp. 219-225.

Yang, Bo et al., Range Winding for Wide Input Range Front End DC/DC Converter, Sixteenth Annual Applied Power Electronics Conference and Exposition, 2001, APEC 2001, IEEE, Mar. 4-8, 2001, pp. 476-479 (vol. 1).

\* cited by examiner

SYSTEMS AND METHODS FOR EXTENSION OF POWER SUPPLY HOLD-UP TIME

TECHNICAL FIELD

The present disclosure relates in general to information handling systems, and more particularly to systems and methods for extension of a power supply hold-up time in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may include a power system including a rectifier for converting an alternating current (AC) voltage (e.g., as available from a public power grid) to a direct current (DC) voltage suitable for use by components of the information handling system. It is typical in existing information handling systems for a power system (also known as a power supply unit or PSU) to provide approximately 10 milliseconds of capacitive "hold-up time" which allows the power system and the information handling system to tolerate small input power disruptions without impacting the operational state of the information handling system. Of the approximately 10 milliseconds of hold-up time, eight to nine milliseconds may be required by a power system to filter out typical noise on alternating current input lines and to determine whether a loss of an alternating current power source has occurred. Thus, only approximately one to two milliseconds of hold-up time is provided to the information handling system, after the power system alerts (e.g., interrupts) the information handling system that the input power source has failed (e.g., by de-asserting an AC_OK signal or similar signal).

While such hold-up time may be sufficient for many applications, longer hold-up times may be desired or necessary to provide certain functionality to an information handling system. For example, non-volatile memory, which may be implemented using non-volatile dual inline memory modules (NVDIMMs) provide the capability to preserve the contents of volatile memory (e.g., dynamic random access memory) by copying the contents of the volatile memory to the non-volatile memory after a command to do so (e.g., after a power failure). Such back-up to non-volatile memory may occur in response to an alert (e.g., interrupt) by a power system to an information handling system indicative of a power failure, to which a memory system may respond by causing information handling resources of the information handling system (e.g., a processor) to flush their write buffers to volatile memory. This process may take one to two milliseconds to complete, and as write buffers increase, may require several more milliseconds of hold-up time in the future, which may serve as a limitation to use of non-volatile memory such as NVDIMMs given typical hold-up times of existing power systems.

Another limitation of non-volatile memory solutions such as NVDIMMs in conjunction with existing power systems is that processor write-back caching must often be disabled, as write-back caches may require approximately 30 milliseconds to perform a cache flush to write cache contents to memory after a power failure, and such duration exceeds the hold-up times of existing power systems.

SUMMARY

In accordance with the teachings of the present disclosure, the disadvantages and problems associated with hold-up times of existing power systems may be reduced or eliminated.

In accordance with embodiments of the present disclosure, a voltage rectifier may include an alternating-current-to-direct-current (AC/DC) converter configured to convert an alternating current (AC) source voltage to a first direct current (DC) voltage and a direct-current-to-direct-current (DC/DC) converter configured to convert the first DC voltage to a second DC voltage for delivery to a load of the voltage rectifier, wherein the DC/DC converter is configured to operate in a plurality of operating modes in response to a failure of the AC source voltage. The plurality of operating modes may include a first hold-up mode in which a gain of the DC/DC converter is a first gain and a second hold-up mode in which the gain of the DC/DC converter is a second gain.

In accordance with these and other embodiments of the present disclosure, a method may include determining an occurrence of a failure of an alternating current (AC) source voltage to an alternating-current-to-direct-current (AC/DC) converter configured to convert the AC source voltage to a first direct current (DC) voltage. The method may also include, responsive to the failure of the AC source voltage, operating a direct-current-to-direct-current (DC/DC) converter configured to convert the first DC voltage to a second DC voltage for delivery to a load in a plurality of operating modes in response to a failure of the AC source voltage. The plurality of operating modes may include a first hold-up mode in which a gain of the DC/DC converter is a first gain and a second hold-up mode in which the gain of the DC/DC converter is a second gain.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal data assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, power supplies, air movers (e.g., fans and blowers) and/or any other components and/or elements of an information handling system.

Figure 1:
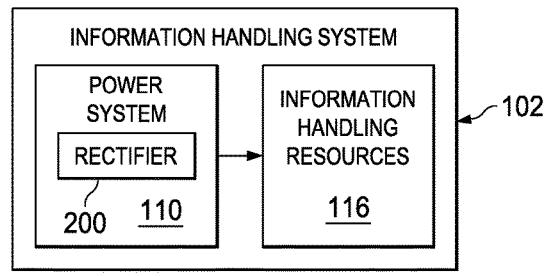
FIG. 1 illustrates a block diagram of an example information handling system, in accordance with embodiments of the present disclosure.

FIG. 1 illustrates a block diagram of an example of an information handling system 102. In some embodiments, information handling system 102 may comprise a server. In other embodiments, information handling system 102 may comprise networking equipment for facilitating communication over a communication network. In yet other embodiments, information handling system 102 may comprise a personal computer, such as a laptop, notebook, or desktop computer. In yet other embodiments, information handling system 102 may be a mobile device sized and shaped to be readily transported and carried on a person of a user of information handling system 102 (e.g., a smart phone, a tablet computing device, a handheld computing device, a personal digital assistant, etc.).

As shown in FIG. 1, information handling system 102 may include a power system 110 and one or more other information handling resources 116.

Generally speaking, power system 110 may include any system, device, or apparatus configured to supply electrical current to one or more information handling resources 116. In some embodiments, power system 110 may include rectifier 200, such as the rectifier depicted in FIG. 2.

Generally speaking, information handling resources 116 may include any component system, device or apparatus of information handling system 102, including without limitation processors, buses, computer-readable media, input-output devices and/or interfaces, storage resources, network interfaces, motherboards, electro-mechanical devices (e.g., fans), displays, and/or power supplies.

Figure 2:
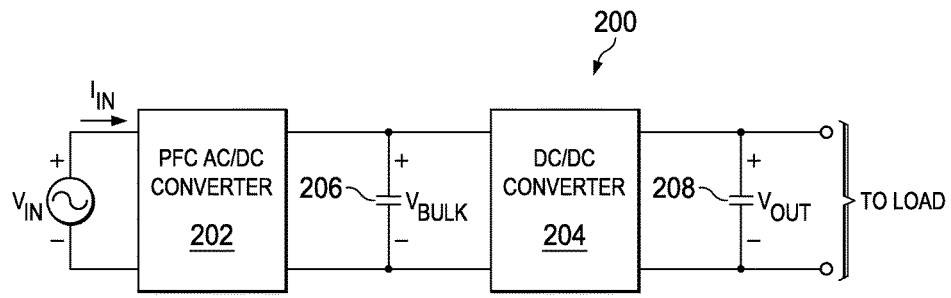
FIG. 2 illustrates a block diagram of an example rectifier, in accordance with embodiments of the present disclosure.

FIG. 2 illustrates a block diagram of an example rectifier 200, in accordance with embodiments of the present disclosure. As shown in FIG. 2, rectifier 200 may include two converter stages: a power factor correcting (PFC) alternating current to direct current (AC/DC) converter stage 202, a DC/DC converter stage 204, a bulk capacitor 206 coupled between an output of PFC AC/DC converter stage 202 and an input of DC/DC converter stage 204 and an output capacitor 208 coupled to an output of DC/DC converter stage 204.

PFC AC/DC converter stage 202 may be configured to, based on an input current $i_{in}$, a sinusoidal source voltage $v_{in}$, and a bulk capacitor voltage $V_{BULK}$, shape the input current $i_{in}$ to have a sinusoidal waveform in-phase with the source voltage $v_{in}$ and to generate regulated DC bus voltage $V_{BULK}$ on bulk capacitor 206. In some embodiments, PFC AC/DC converter stage 202 may be implemented as an AC/DC converter using a boost converter topology.

DC/DC converter stage 204 may convert bulk capacitor voltage $V_{BULK}$ to a DC output voltage $V_{OUT}$ on output capacitor 208 which may be provided to a load (e.g., to information handling resources 116 in order to power such information handling resources 116). In some embodiments, DC/DC converter stage 204 may be implemented as a resonant converter which converts a higher DC voltage (e.g., 400 V) into a lower DC voltage (e.g., 12 V).

Figure 3:
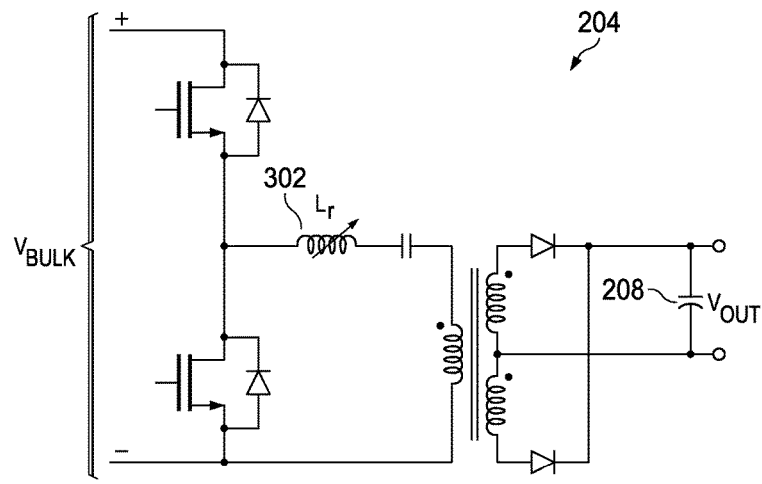
FIG. 3 illustrates a block diagram of an example DC/DC converter stage, in accordance with embodiments of the present disclosure.

FIG. 3 illustrates a block diagram of an example DC/DC converter stage 204, in accordance with embodiments of the present disclosure. Those of ordinary skill in the art may recognize example DC/DC converter stage 204 as an LLC resonant converter, with its typical fixed resonant inductor replaced with a variable inductor 302 having a variable inductance $L_r$. Because the structure of the LLC resonant converter 204 depicted in FIG. 3 other than variable inductor 302 is known by those of ordinary skill in the art, the structure and functionality of components other than variable inductor 302 are not described in detail. In some embodiments, regulation of the output of DC/DC converter stage 204 is achieved by varying an operating switching frequency of DC/DC converter stage 204.

Variable inductor 302 may comprise any passive two-terminal electrical component which resists changes in electric current passing through it and having an inductance $L_r$ that may be variable. Variable inductor 302 may comprise an inductor with a movable ferrite magnetic core, an air core inductor with sliding contacts or multiple taps to increase or decrease the number of turns included in the inductor, a variometer, or any other suitable device with a variable inductance. In some embodiments, variable inductor 302 may comprise an inductor with a secondary control winding wound on the same magnetic core, in which inductance of variable inductor 302 may be varied in response to a current in the control winding. In these and other embodiments, variable inductor 302 may have only two possible inductances.

Figure 4:
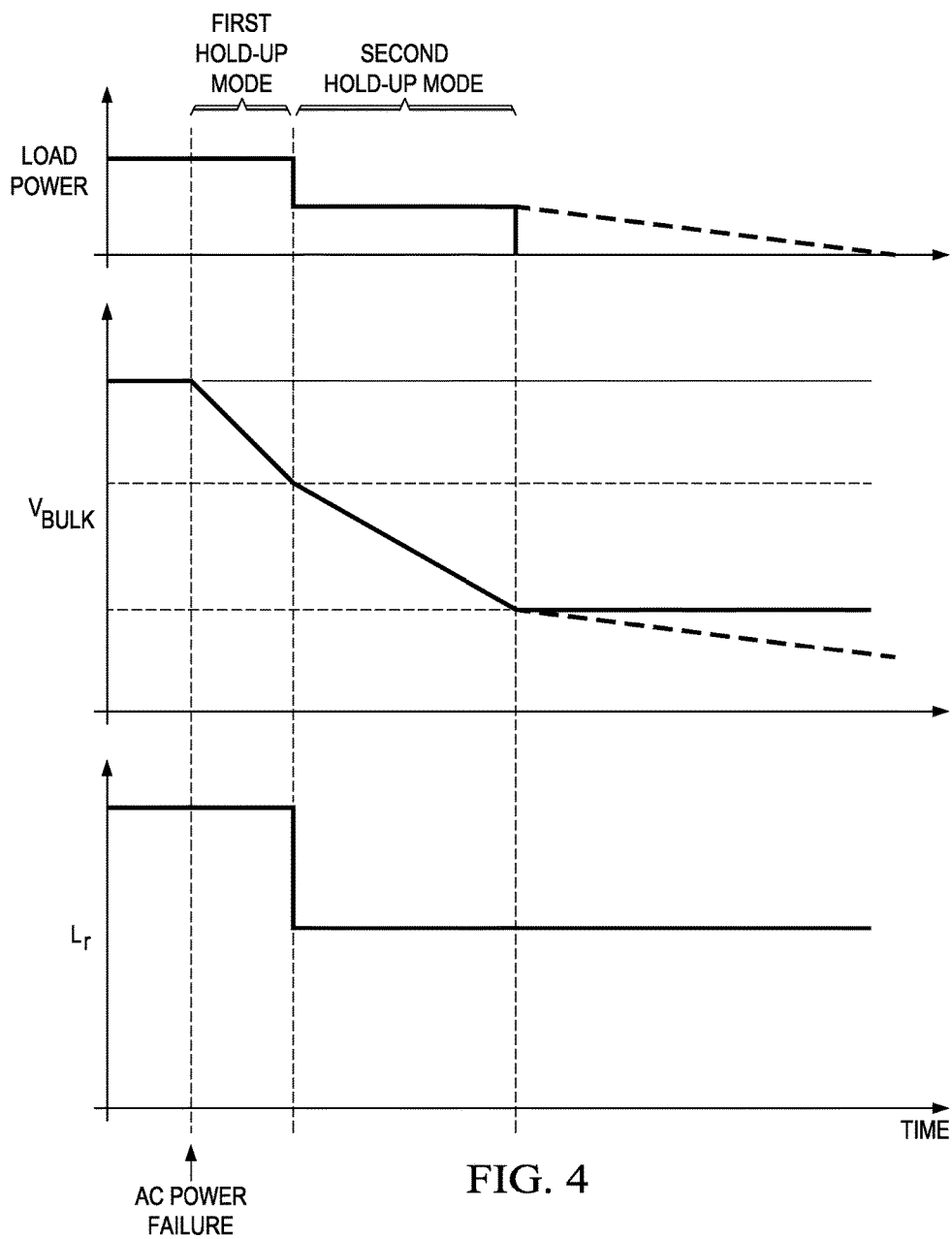
FIG. 4 illustrates a graph depicting various operating modes of a power system, in accordance with embodiments of the present disclosure.

FIG. 4 illustrates a graph depicting various operating modes of power system 110, in accordance with embodiments of the present disclosure. In operation, in response to an AC power failure (e.g., removal of an AC power source to the input of PFC AC/DC converter 202), power system 110 may enter a first hold-up mode. During the first hold-up mode, power system 110 may deliver a first power to its load (e.g., information handling resources 116), and variable inductor 302 may have a first inductance. In some embodiments, during the first hold-up mode, the first power delivered to the load may be approximately equal to that delivered to the load prior to the AC power failure. In these and other embodiments, the first inductance of variable inductor 302 may be approximately equal to the inductance of variable inductor 302 prior to the AC power failure. During the first hold-up mode, voltage $V_{BULK}$ may decrease (e.g., from 400 V to 320 V) while output voltage $V_{OUT}$ remains constant (e.g., 12 V). In some embodiments, output voltage $V_{OUT}$ may maintain the voltage level it had prior to the AC power failure.

During the second hold-up mode, power system 110 may deliver a second power to its load (e.g., information handling resources 116) substantially lower than (e.g., one-half of) the first power (e.g., information handling resources 116 may be throttled to reduce their power consumption). Such decrease in power consumption may have the effect of increasing the gain of DC/DC converter stage 204, thus allowing an extension of hold-up time beyond that of the first hold-up mode. In these and other embodiments, during the second hold-up mode, variable inductor 302 may have a second inductance substantially lower than the first inductance. Such decrease in inductance may also have the effect of increasing the gain of DC/DC converter stage 204, thus allowing an extension of hold-up time beyond that of the first hold-up mode. During the second hold-up mode, voltage $V_{BULK}$ may decrease (e.g., from 320 V to 200 V) while output voltage $V_{OUT}$ remains constant (e.g., 12 V). In some embodiments, output voltage $V_{OUT}$ may maintain the voltage level it had during the second hold-up mode. In some embodiments, power system 110 may transition from the first hold-up mode to the second hold-up mode in response to decrease of bulk voltage $V_{BULK}$ below a threshold voltage (e.g., 320 V) and/or in response to an indication from an information handling resource 116 that the information handling resource 116 has throttled power. In some embodiments, the second hold-up mode may end (and the hold-up time may expire) in response to decrease of bulk voltage $V_{BULK}$ below a second threshold voltage (e.g., 200 V).

Although the present disclosure has been described in detail, it should be understood that various changes, substitutions, and alterations can be made hereto without departing from the spirit and the scope of the disclosure as defined by the appended claims.

What is claimed is:

1. A voltage rectifier comprising:
an alternating-current-to-direct-current (AC/DC) converter configured to convert an alternating current (AC) source voltage to a first direct current (DC) voltage;
a direct-current-to-direct-current (DC/DC) converter configured to convert the first DC voltage to a second DC voltage for delivery to a load of the voltage rectifier, wherein the DC/DC converter includes a variable inductor and is configured to, in response to a single failure of the AC source voltage, operate in a plurality of operating modes by:
operating in a first hold-up mode in which a gain of the DC/DC converter is a first gain, and in which an inductance of the variable inductor is approximately equal to the inductance of the variable inductor in the absence of a failure of the AC source voltage; and
in response to the load throttling its power consumption to reduce an amount of current drawn by the load, transitioning to a second hold-up mode by decreasing the inductance of the variable inductor to increase the gain of the DC/DC converter to a second gain.

2. The voltage rectifier of claim 1, wherein the first gain is approximately equal to the gain of the DC/DC converter in the absence of the failure of the AC source voltage.

3. The voltage rectifier of claim 1, wherein the DC/DC converter is configured to increase its gain from the first gain to the second gain by reducing an amount of power delivered from the voltage rectifier to the load.

4. The voltage rectifier of claim 3, wherein the amount of power delivered from the voltage rectifier to the load during the first hold-up mode is approximately equal to the amount of power delivered from the voltage rectifier to the load in the absence of the failure of the AC source voltage.

5. The voltage rectifier of claim 1, wherein the DC/DC converter is further configured to increase its gain from the first gain to the second gain by reducing an amount of power delivered from the voltage rectifier to the load.

6. The voltage rectifier of claim 5, wherein the amount of power delivered from the voltage rectifier to the load during the first hold-up mode is approximately equal to the amount of power delivered from the voltage rectifier to the load in the absence of the failure of the AC source voltage.

7. The voltage rectifier of claim 1, wherein in the first hold-up mode, the inductance of the variable inductor is equal to the inductance of the variable inductor in the absence of the failure of the AC source voltage.

8. The voltage rectifier of claim 1, wherein the first gain is equal to the gain of the DC/DC converter in the absence of the failure of the AC source voltage.

9. A method comprising:
determining an occurrence of a single failure of an alternating current (AC) source voltage to an alternating-current-to-direct-current (AC/DC) converter configured to convert the AC source voltage to a first direct current (DC) voltage; and
responsive to the single failure of the AC source voltage, operating a direct-current-to-direct-current (DC/DC) converter that includes a variable inductor and is configured to convert the first DC voltage to a second DC voltage for delivery to a load in a plurality of operating modes by:

operating in a first hold-up mode in which a gain of the DC/DC converter is a first gain, and in which an inductance of the variable inductor is approximately equal to the inductance of the variable inductor in the absence of a failure of the AC source voltage; and in response to the load throttling its power consumption to reduce an amount of current drawn by the load, transitioning to a second hold-up mode by decreasing the inductance of the variable inductor to increase the gain of the DC/DC converter to a second gain.

10. The method of claim 9, wherein the first gain is approximately equal to the gain of the DC/DC converter in the absence of the failure of the AC source voltage.

11. The method of claim 9, further comprising increasing the gain of the DC/DC converter from the first gain to the second gain by reducing an amount of power delivered to the load.

12. The method of claim 11, wherein the amount of power delivered to the load during the first hold-up mode is approximately equal to the amount of power delivered to the load in the absence of the failure of the AC source voltage.

13. The method of claim 9, further comprising further increasing the gain of the DC/DC converter from the first gain to the second gain by reducing an amount of power delivered to the load.

14. The method of claim 13, wherein the amount of power delivered to the load during the first hold-up mode is approximately equal to the amount of power delivered to the load in the absence of the failure of the AC source voltage.

15. A voltage rectifier comprising:

an alternating-current-to-direct-current (AC/DC) converter configured to convert an alternating current (AC) source voltage to a first direct current (DC) voltage;

a direct-current-to-direct-current (DC/DC) converter configured to convert the first DC voltage to a second DC voltage for delivery to a load of the voltage rectifier, wherein the DC/DC converter includes a variable inductor and is configured to, in response to a single failure of the AC source voltage, operate in a plurality of operating modes by:

operating in a first hold-up mode in which a gain of the DC/DC converter is a first gain; and in response to the load throttling its power consumption to reduce an amount of current drawn by the load, transitioning to a second hold-up mode in which the gain of the DC/DC converter is a second gain, wherein the transitioning includes changing an inductance of the variable inductor, and wherein the transitioning further includes increasing the gain from the first gain to the second gain by reducing an amount of power delivered from the voltage rectifier to the load.

16. The voltage rectifier of claim 15, wherein the first gain is approximately equal to the gain of the DC/DC converter in the absence of a failure of the AC source voltage.

17. The voltage rectifier of claim 15, wherein the amount of power delivered from the voltage rectifier to the load during the first hold-up mode is approximately equal to the amount of power delivered from the voltage rectifier to the load in the absence of a failure of the AC source voltage.

18. The voltage rectifier of claim 15, wherein in the first hold-up mode, the inductance of the variable inductor is equal to the inductance of the variable inductor in the absence of the failure of the AC source voltage.

19. The voltage rectifier of claim 15, wherein the first gain is equal to the gain of the DC/DC converter in the absence of the failure of the AC source voltage.

* * * * *